US006609903B2

(12) United States Patent
Kurimoto

(10) Patent No.: US 6,609,903 B2
(45) Date of Patent: Aug. 26, 2003

(54) APPARATUS FOR MOLDING A CONNECTOR

(75) Inventor: Naoya Kurimoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/996,916

(22) Filed: Nov. 30, 2001

(65) Prior Publication Data

US 2002/0074694 A1 Jun. 20, 2002

(30) Foreign Application Priority Data

Dec. 18, 2000 (JP) ...................................... 2000-383694

(51) Int. Cl.[7] .............................................. B29C 45/44
(52) U.S. Cl. ....................... 425/556; 425/517; 425/577; 425/588; 264/238
(58) Field of Search ...................... 264/238; 425/577, 425/588, 517, 556; 29/428

(56) References Cited

U.S. PATENT DOCUMENTS

| 5,814,356 A | | 9/1998 | Ito et al. | |
|---|---|---|---|---|
| 5,894,661 A | * | 4/1999 | Wada et al. | ................... 29/883 |
| 5,911,935 A | * | 6/1999 | Kawase | ...................... 264/238 |
| 6,318,991 B1 | * | 11/2001 | Kawase | ...................... 425/556 |

FOREIGN PATENT DOCUMENTS

JP          9-11239          1/1997

\* cited by examiner

Primary Examiner—Jill L. Heitbrink
Assistant Examiner—Monica A Fontaine
(74) Attorney, Agent, or Firm—Greenblum & Bernstein, P.L.C.

(57) ABSTRACT

A retainer installation through hole is formed in a connector housing by an installation hole forming pin. After molding the connector housing and a retainer, the retainer is assembled from a side opposite the side where the installation hole forming pin is extracted for the retainer installation hole. Thus, since interference of the retainer installation hole with the retainer is avoided, a mold construction can be simplified. Further, since the direction of motion of the respective parts of a mold apparatus are only in biaxial directions of up and down and transverse (X,Y axis directions), the molding spaces of a plurality of connectors can be provided in the mold apparatus along a third axis direction (fore and aft direction, namely Z axis direction) in a line. Thus, the molding and assembling of parts for many connectors can be simultaneously carried out by a single mold apparatus.

8 Claims, 7 Drawing Sheets

APPARATUS FOR MOLDING A CONNECTOR

BACKGROUND OF THE INVENTION

1. Field of the Invention

The present invention relates to the production process of a connector and to the mold structure of a connector by which the molding and assembling of a plurality of parts are carried out in a single mold.

2. Description of Background Information

When a connector is produced, a connector housing and auxiliary parts such as a retainer and the like were molded in general by separate molds, then they were taken out and delivered to a temporary assembly location, and a completed product has been obtained by temporarily assembling the housing and the auxiliary parts. However, since such method has many working steps and high costs, a method known as a so-called in-mold assembly, in which a connector housing and auxiliary parts such as a retainer and the like were molded in one mold and then the components are assembled in the same mold, has been used as a method for solving the above problems. Further, such production method of a connector is disclosed in, for example, Japanese Patent Publication (Kokai) HEI No. 9-11239.

Furthermore, as a connector which is equipped with a retainer for eliminating the slip of terminal fittings, there is a so-called side retainer type in which a retainer is inserted from the side face of a connector housing so that it crosses the terminal fittings. Such a connector is schematically shown in FIG. 8. A connector housing 1 has a generally box shape, and a plurality of through cavities 2 are provided to extend in the up and down direction as shown in the drawing. Further, a retainer installation hole 3, which is connected with the respective cavities 2, is provided in one side of the connector housing, and a retainer 4 is configured to be inserted into a retaining position.

Considering a mold structure in such connector when molding and assembling are carried out in a mold as described above, it is firstly required that a mold which moves in the up and down direction (X-axis direction) for forming the cavities 2 of the connector housing 1 is provided. Further, a mold which is equipped with a pin extends in the transverse direction (Y-axis direction) and moves in the transverse direction is required at least for forming the retainer installation hole 3. In order to mold the retainer 4 and assemble it to the retainer installation hole 3 while avoiding interference with these molds, the retainer 4 is molded at a position which is spaced apart in the fore and aft direction (Z-axis direction) relative to the connector housing 1.

An example of the assembly procedure of the known connector of FIG. 8 is now described. First, after the connector housing 1 and the retainer 4 are molded in a closed mold condition, a mold in the up and down direction (X-axis direction) is opened, a mold in the transverse direction (Y-axis direction) is further opened to pull out the pin from the retainer installation hole 3, and it is retracted to a position at which interference with the retainer 4 can be avoided. Then, the retainer 4 is pushed in the fore and aft direction (Z-axis direction), and moved to a position (illustrated by double dotted line) at which it is aligned with the retainer installation hole 3. Then, the retainer 4 is pushed in the transverse direction (Y-axis direction), and is inserted in the retainer installation hole 3.

Thus, when auxiliary parts such as the retainer and the like are installed in the installation hole of the connector housing, the pin for forming the installation hole is pulled out from the mold of the connector housing. Thus, a construction for avoiding interference of the mold and the auxiliary parts and the like is required in order to install the auxiliary parts in the installation hole from the same position. Therefore, the mold construction is complicated and cost increases have been induced. Further, in the above-mentioned mold construction, since members which move in the three axial directions, up and down, transverse, and fore and aft directions are provided, it has been extremely difficult to make a construction by which many connector parts are simultaneously molded by one mold configuration as they are assembled.

The present invention was completed considering the above-mentioned circumstances, and an object is to provide a production process of a connector and a mold construction of the connector by which the mold construction can be simplified.

SUMMARY OF THE INVENTION

According to a first aspect of the present invention, a process is provided for molding a connector including a connector housing and at least one auxiliary part thereof in a single mold and then assembling the connector housing and the at least one auxiliary part together in the single mold. The process includes providing molding spaces for the connector housing and the at least one auxiliary part in the mold, providing an installation hole forming pin that protrudes into the molding space of the connector housing to form an installation through hole for installing the at least one auxiliary part in the connector housing. The process also includes providing the molding space of the at least one auxiliary part in alignment with an extension line of the installation hole forming pin, and installing the at least one auxiliary part in the installation through hole from a side opposite the mold extraction side of the installation through hole forming pin by pressing the at least one auxiliary part toward the connector housing side by a pressing part subsequent to completion of molding.

According to another aspect of the present invention, a mold apparatus is provided for molding a connector including a connector housing and at least one auxiliary part therefor in a single mold and then assembling the connector housing and the at least one auxiliary part in the single mold. The mold apparatus includes molding spaces for the connector housing and for the at least one auxiliary part provided in the single mold. An installation through hole forming pin is provided to protrude into the molding space of the connector housing to form an installation through hole for installing the at least one auxiliary part in the connector housing. The molding space of the at least one auxiliary part is arranged on an extension line of the installation through hole forming pin so that the at least one auxiliary part is installed in the installation through hole from a side opposite a mold extraction side of the installation through hole forming pin by pressing the at least one auxiliary part toward the connector housing side by a pressing part subsequent to completion of molding.

According to other aspects of the present invention, the installation through hole is formed in the connector housing by the installation through hole forming pin. After the connector housing and the at least one auxiliary part is molded, the at least one auxiliary part is assembled in the installation through hole from the side opposite the mold extraction side of the installation through hole forming pin. Thus, since interference of the installation through hole forming pin with the at least one auxiliary part is avoided, the mold construction can be simplified. Further, the mold apparatus can be configured so that the direction of movement of the respective parts of the mold is only along two axis lines of direction. Thus, the molding spaces of a plurality of connectors can be provided in the mold aligned along a third axis line direction. Therefore, the molding and fabrication of parts for many connectors can be simultaneously carried out by a single mold apparatus.

According to another aspect of the present invention, a single mold apparatus is provided for molding a connector including a connector housing and at least one auxiliary part therefor in a single mold and then assembling the connector housing and the at least one auxiliary part in the single mold. The single mold apparatus includes at least a first molding space for molding the connector housing, at least a second molding space for molding the at least one auxiliary part provided in the mold, and at least one installation hole forming pin provided to protrude into the first molding space of the connector housing to form an installation through hole configured to receive the at least one auxiliary part in the connector housing. The second molding space is aligned with an extension line of the installation through hole forming pin so that the at least one auxiliary part is installable in the installation through hole from a side opposite a mold extraction side of the installation hole forming pin by pressing the at least one auxiliary part toward the connector housing side subsequent to completion of molding.

In another aspect of the present invention, the single mold apparatus may include a lower mold part, an upper mold part, a left slide mold and a right slide mold, and wherein portions of the upper mold, the lower mold and the left slide mold form the first molding space, and portions of the upper mold, the lower mold and the right slide mold form the second molding space. Additionally, the left slide mold may include an installation hole forming pin that is extendible into and out of the first molding space to form an installation through hole in the connector housing.

In a further aspect of the present invention, the second molding space is positioned in alignment with the installation forming pin and the installation through hole so that upon completion of molding and separation of mold parts, the auxiliary part is directly insertable into the installation through hole in a single linear motion while the connector housing and the auxiliary part remain within the confines of the single mold apparatus.

In a still further aspect of the present invention, the single mold apparatus may include first drive mechanism operatively connected between the upper mold and the left slide mold so that movement of the upper mold toward and away from the lower mold causes the left slide mold to move transversely of the upper and lower molds which results in movement of the installation hole forming pin into and out of the first mold space.

According to another aspect of the present invention, the single mold apparatus may further include a driving part movable in a direction toward and away from the right slide mold, and the right slide mold may include a pressing part for pressing the auxiliary part transversely into the installation through hole. Additionally, a second drive mechanism is operatively connected between the driving part and the right slide mold so that movement of the driving part toward and away from the right slide mold causes the right slide mold to move transversely of the upper and lower molds which results in movement of the pressing part into and out of the second mold space to thereby press the auxiliary part at least partially into the installation through hole while the connector housing and the auxiliary part remain within the confines of the single mold apparatus.

The first driving mechanism may include an angular pin provided on one of the upper mold and the left slide mold and a complementary angular receiving hole provided on the other of the upper mold and the left slide mold, and the second driving mechanism may include an angular pin provided on one of the driving part and the right slide mold and a complementary angular receiving hole provided on the other of the driving part and the right slide mold.

In a further aspect of the present invention, the single mold apparatus may further include an ejector provided in the lower mold adjacent the first mold space, the ejector being movable relative to the lower mold to eject the completed connector from the first mold space.

In a still further aspect of the present invention, the single mold apparatus may further include a plurality of first and second mold spaces formed by the upper, lower, left slide and right slide molds and aligned so that a plurality of connector housings and auxiliary parts are simultaneously moldable and assembleable within the single mold apparatus.

BRIEF DESCRIPTION OF THE DRAWINGS

The above and other objects, features and advantages of the present invention will be made apparent from the following description of the preferred embodiments, given as non-limiting examples, with reference to the accompanying drawings in which.

DESCRIPTION OF THE PREFERRED EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention will now be described with reference to FIGS. 1–7.

Figure 1:
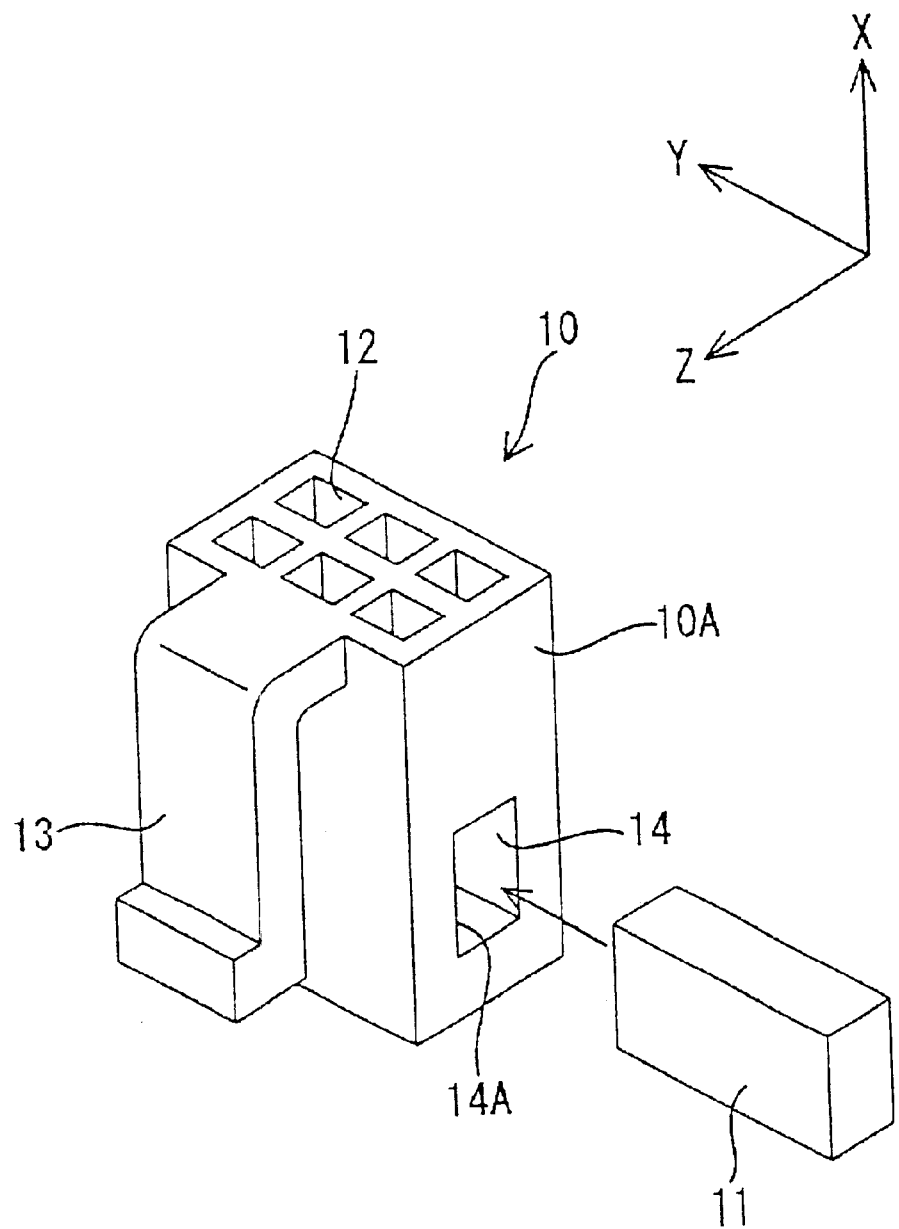
FIG. 1 is an exploded perspective view of a connector housing and a retainer according to an embodiment of the present invention.
Figure 2:
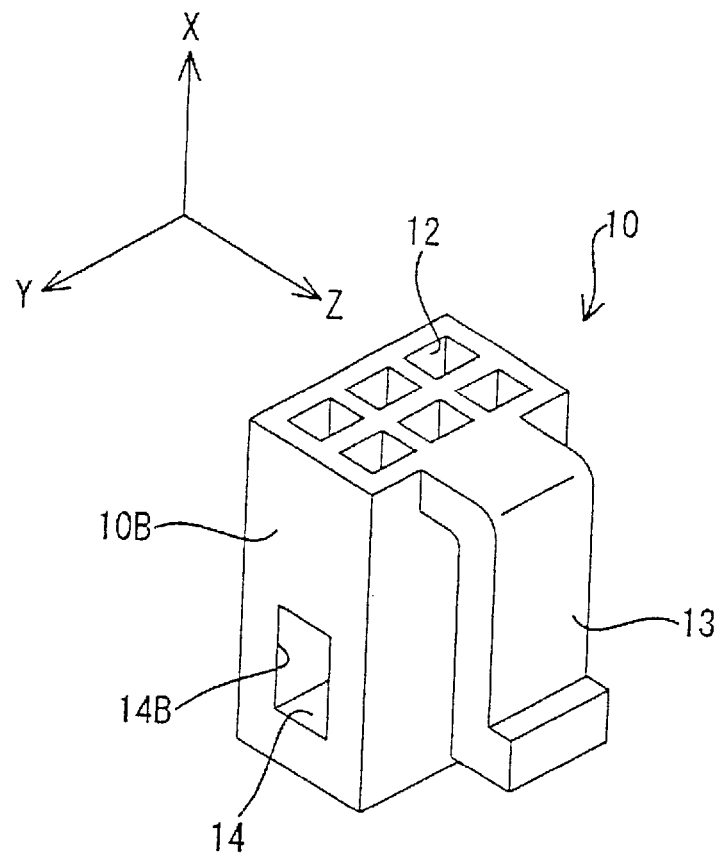
FIG. 2 is a perspective view showing a connector housing in accordance with an embodiment of the present invention.
Figure 3:
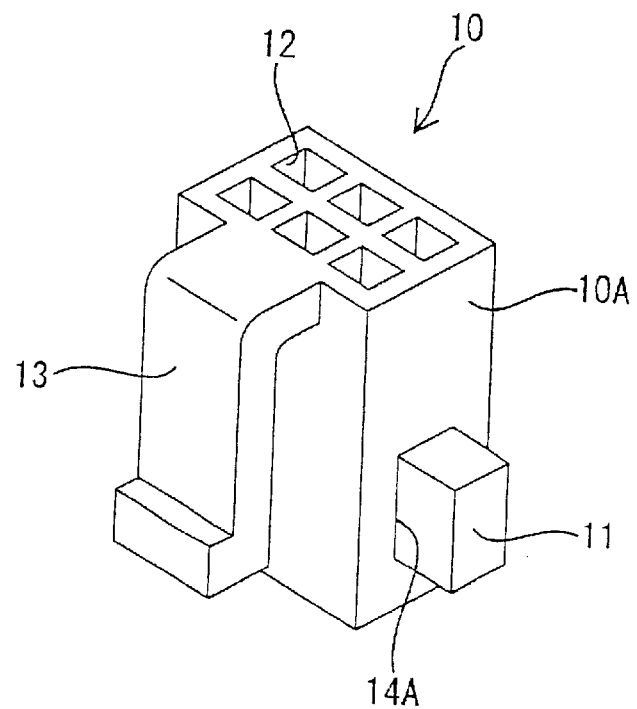
FIG. 3 is a perspective view showing a condition in which a retainer is assembled on a connector housing.

First, the connector which is molded in accordance with the present invention will be briefly described. The connector is shown in FIGS. 1–3. The connector is formed by a connector housing 10 and a retainer 11 (equivalent to the "auxiliary parts" of the present invention) which are made, for example, of a synthetic resin material. The connector housing 10 is configured to have a generally box shape as a whole, and a plurality of through cavities 12 into which terminal fittings (not illustrated) can be inserted are provided in the up and down direction (X-axis direction). Further, a locking piece 13 for locking on a mating connector (not illustrated) is provided at the front side of the connector housing 10. Further, a retainer installation hole 14 (equivalent to "installation hole" of the present invention) for installing the retainer 11 is provided to extend through the connector housing in the transverse direction (Y-axis direction). Among the openings at the left and right sides of the retainer installation hole 14, the opening of the side face 10A of the right side (FIG. 3) of the connector housing 10 is referred to as the retainer insertion opening 14A into which the retainer 11 can be inserted, and the opening of the side face 10B of the left side (FIG. 2) of the connector housing 10 is referred to as the mold extraction opening 14B for extracting the mold of an installation hole forming pin 29 (FIGS. 4–8) which is described later. On the other hand, the retainer 11 can be fitted in the retainer installation hole 14, and a locking part (not illustrated) is hooked on the connector housing 10 side. Thus, the retainer 11 is designed to be retained at a temporary hooking position (refer to FIG. 3) in a condition in which a portion is inserted in the retainer installation hole 14, and at a complete hooking position in a condition in which the entire retainer 11 is inserted into the retainer installation hole 14. Further, the retainer 11 permits insertion and removal of the terminal fittings in the cavities 12 at the temporary hooking position, and prevents movement of the terminal fittings by being hooked on the terminal fittings at the complete hooking position.

Next, the mold apparatus 20 for molding the above-mentioned connector will now be described with reference to FIGS. 4–7.

Figure 4:
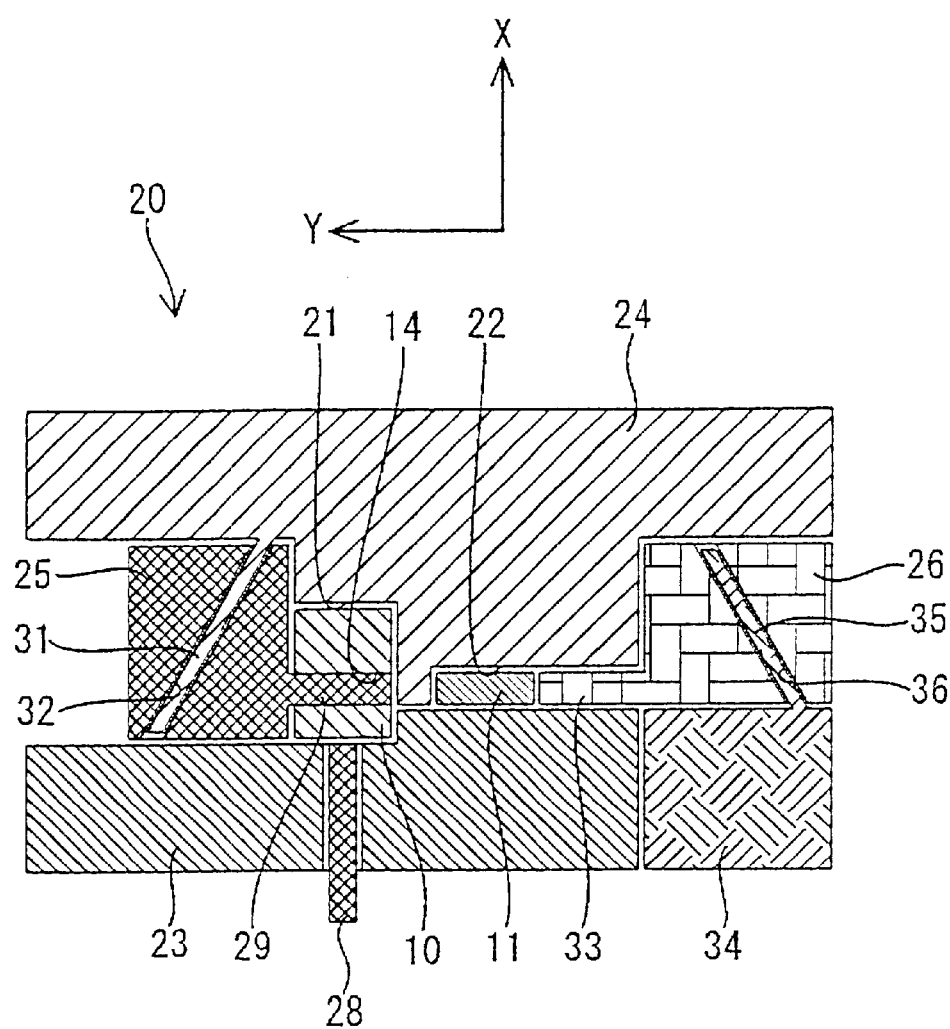
FIG. 4 is a sectional view showing a condition in which a mold according to an embodiment of the present invention is closed.
Figure 5:
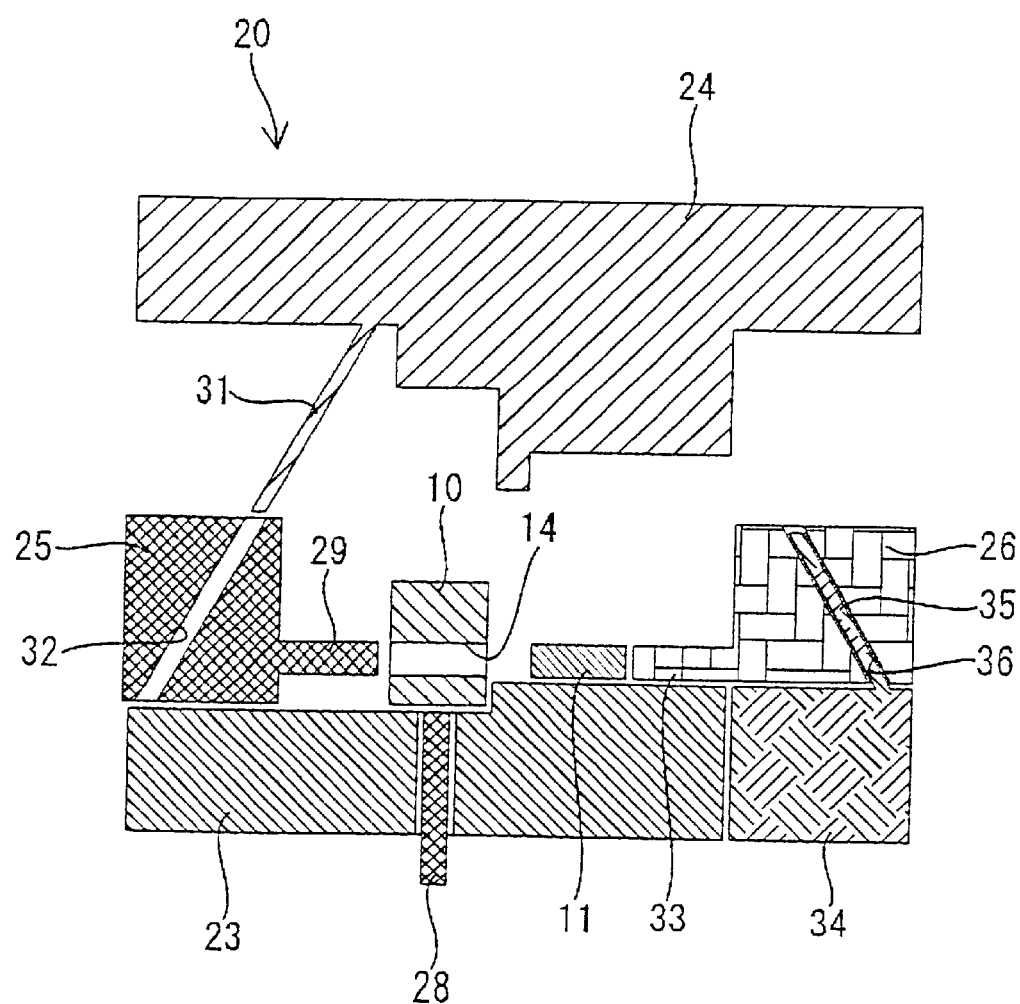
FIG. 5 is a sectional view showing a condition in which the mold shown in FIG. 4 is opened.
Figure 6:
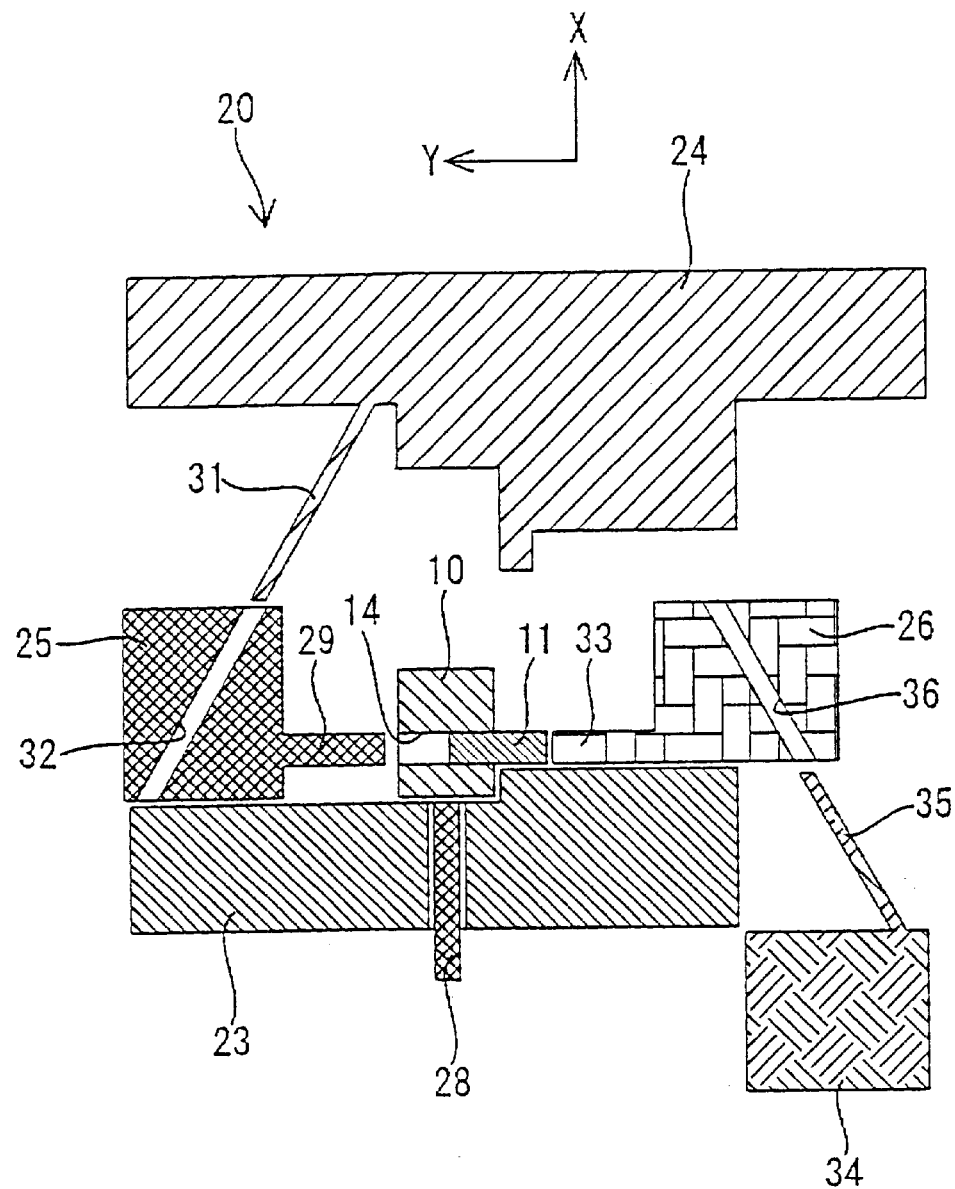
FIG. 6 is a sectional view showing a condition in which a retainer formed in accordance with an embodiment of the present invention is assembled on a connector housing.
Figure 7:
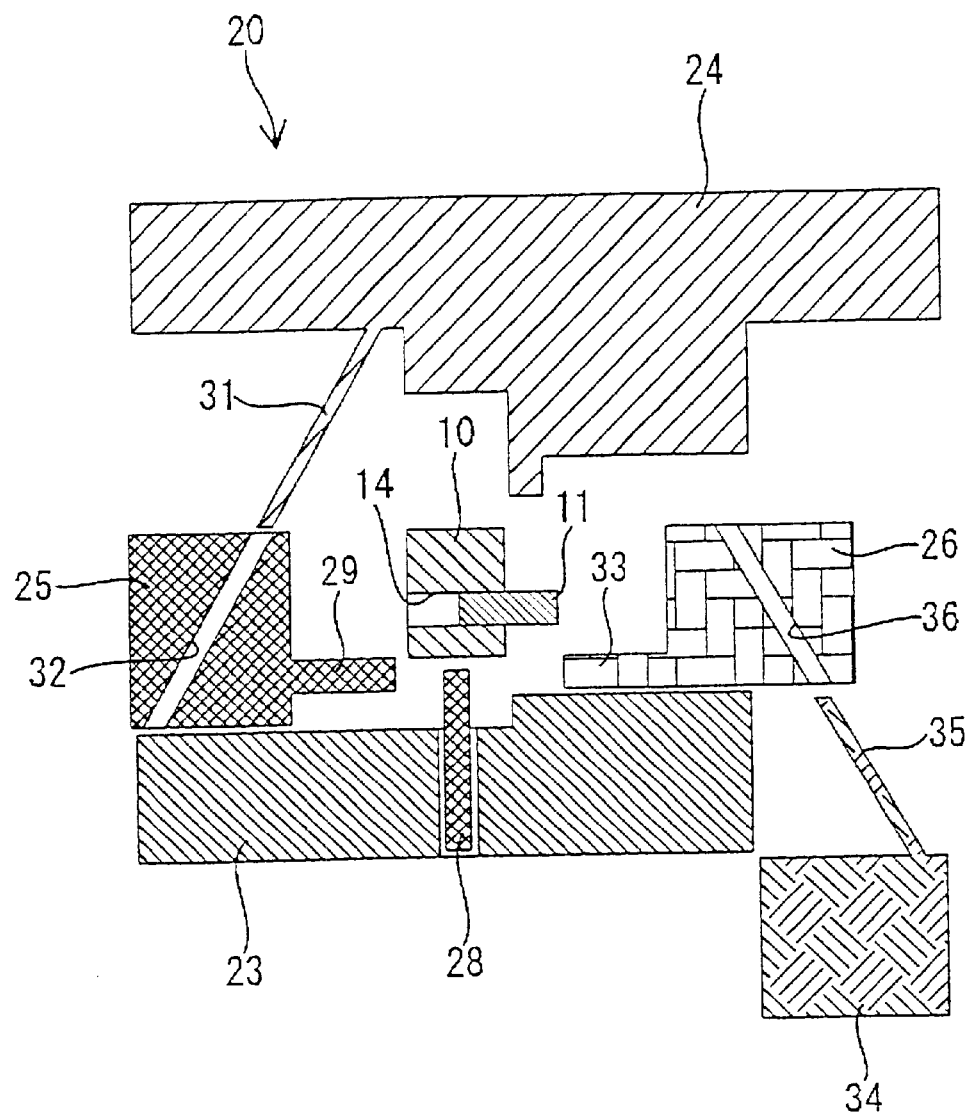
FIG. 7 is a sectional view showing a condition in which the connector formed in accordance with an embodiment of the present invention is removed from the mold.
Figure 8:
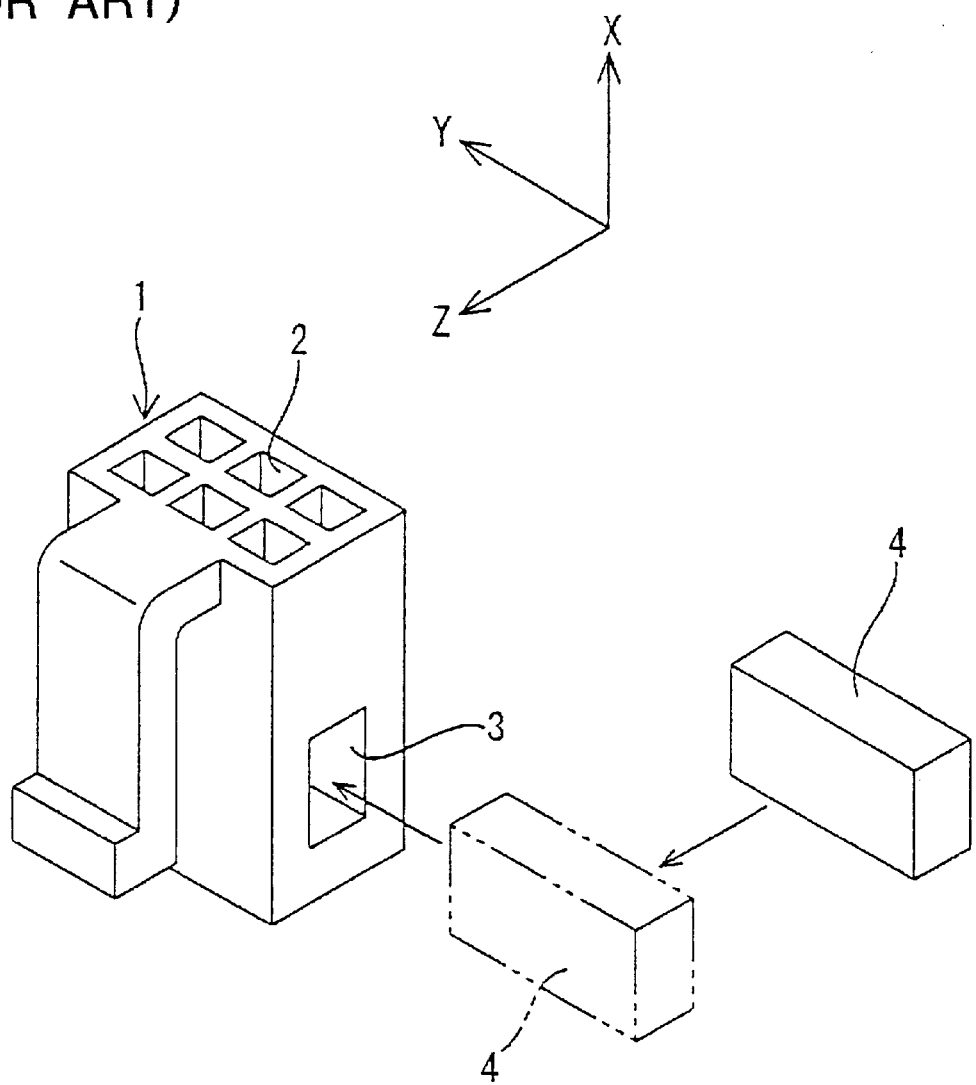
FIG. 8 is a perspective view illustrating a conventional method of assembling a connector.

A molding space 21 for the connector housing 10 and a molding space 22 for the retainer 11 are provided in parallel at left and right sides in the mold apparatus 20. A fixed lower mold 23 is provided at the lower side, and an upper mold 24 which is movable up and down is provided at the upper side. Further, a left slide mold 25 which is movable in the left and right directions is provided at the left side (connector housing side) as illustrated, a right slide mold 26 which is movable in the left and right directions is provided at the right side (retainer side), and together the molds 23, 24, 25 and 26 surround both of the molding spaces 21 and 22 in a closed mold condition (FIG. 4). The lower mold 23 is provided with an ejector pin 28 which is movable in the up and down directions, and after completion of the assembly, the connector which was thus completed is designed to be ejected from the mold.

An installation hole forming pin 29 is provided to protrude from the left side mold 25 along the movement direction (left and right direction). The installation hole forming pin 29 protrudes into the molding space 21 of the connector housing 10 in a closed mold condition, and the entire retainer installation hole 14 of the connector housing 10 penetrates completely through the housing. Further, an angular pin 31 protrudes from the upper mold 24 in an oblique direction against the movement direction. The angular pin 31 penetrates into the receiving hole 32 provided in the left side mold 25 in a condition in which it is movably penetrated in an insertion and extraction direction. Therefore, the opening and closing motion of the left slide mold 25 is designed to be carried out in synchronization with the opening and closing motion of the upper mold 24. Further, the molding space 22 of the retainer 11 is arranged in alignment with the installation hole forming pin 29. Namely, the retainer 11 is molded at a position that faces the right side of the retainer installation hole 14. A pressing part 33 is provided to protrude from the retainer installation through hole 14, and provides an opened mold condition (refer to FIG. 5).

Next, the driving part 34 is moved downwardly, which causes the angular pin 35 to slip out from the receiving hole 36. This causes the right slide mold 26 to move to the left, and the pressing part 33 presses the retainer 11 toward the connector housing 10 side. The retainer 11 is then inserted in the retainer installation hole 14 from the retainer insertion opening 14A side, until the retainer reaches the temporary hooking position, and then, the assembly (temporary assembly) of the connector is completed (refer to FIG. 6). Subsequently, the connector is ejected from the mold by ejector pin 28, and a completed connector can be obtained.

As illustrated above, according to the present embodiment, the retainer installation through hole 14 is formed completely through the connector housing 10 by the installation through hole forming pin 29, and after the connector housing 10 and the retainer 11 are molded, the retainer 11 is assembled in the retainer installation through hole 14 from the side opposite from the side where the mold of the installation hole forming pin 29 is extracted. Thus since the interference of the installation hole forming pin 29 with the retainer 11 is avoided, the mold structure can be simplified. Further, since the motion directions of the right slide mold 26 at the right face of the molding space 22 of the retainer 11, and thus, the molded retainer 11 can be pressed toward the connector housing 10 side. Further, a driving part 34 which is movable in the up and down directions is provided under the right slide mold 26. An angular pin 35 is provided to protrude from driving part 34 in an oblique direction against the movement direction and penetrates into the receiving hole 36 which is provided in the right slide mold 26 in a condition in which it movable penetrates in the insertion and removal direction. Therefore, the right slide mold 26 is configured to be moved in the left and right directions in accordance with the elevating motion of the driving part 34.

Next, the process of producing the connector utilizing the mold apparatus 20 configured as described above will now be described. First, as shown in FIG. 4, a melted resin is filled in the molding spaces 21 and 22 of the connector housing 10 and the retainer 11. After solidifying the resin after a fixed period of time, the upper mold 24 is elevated, which causes the angular pin 31 to slip out from the receiving hole 32, and the left slide mold 25 is moved to the left. The installation hole forming pin 29 also slips out of the mold extraction opening 14B of the respective parts of a mold apparatus 20 are made as a structure only for biaxial directions of up and down and transverse (X, Y axis directions), molding spaces of a plurality of connectors can be provided in the mold equipment 20 along the third axis line direction (fore and aft direction, namely Z axis direction) in a line, and thus, the molding and assembling of parts for many connectors can be simultaneously carried out by a single mold apparatus 20.

The technical scope of the present invention is not limited to the above-mentioned embodiment, and for example, the following variations are also included in the technical scope of the present invention.

(1) In the above-mentioned embodiment, the connector in which the retainer 11 is assembled to the connector housing 10 has been shown, but according to another aspect of the present invention, articles other than a retainer may serve as the auxiliary parts which are assembled to the connector housing. For example, in a lever type connector in which the fitting with a mating connector is carried out by a cam action of operating to insert opposite ends of a generally U-shaped lever in the connector housing, a pair of installation holes into which the opposite ends of the lever are inserted are formed through the connector housing, and the lever are molded at the same time. Then, the assembly of the housing and the lever may be carried out in the mold in a manner similar to the first embodiment.

(2) The mold apparatus 20 of the above embodiment moves in biaxial directions of up and down and transversely (X,Y axis directions). However, the mold structure is not limited to the above-mentioned structure, and for example, a member which moves in the fore and aft direction (Z-axis direction) may be provided in the mold apparatus.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. JP 2000-383694, filed on Dec. 18, 2000, the disclosure of which is herein expressly incorporated by reference in its entirety.

What is claimed is:

1. A single mold apparatus for molding a connector including a connector housing and at least one auxiliary part therefor in a single mold and then assembling the connector housing and the at least one auxiliary part in the single mold, said single mold apparatus comprising:

at least a first molding space for molding the connector housing;

a lower mold part, an upper mold part, a left slide mold and a right slide mold, and wherein portions of said upper mold, said lower mold and said left slide mold form said first molding space, and portions of said upper mold, said lower mold and said right slide mold form said second molding space;

at least one installation hole forming pin provided to protrude into said first molding space of the connector housing to form an installation through hole configured to receive said at least one auxiliary part in the connector housing and extending from a mold extraction side thereof through the connector housing to a side opposite the mold extraction side, said second molding space being aligned with an extension line of the installation through hole forming pin so that said at least one auxiliary part is installable in the installation through hole from the side opposite the mold extraction side of the installation through hole by pressing the at least one auxiliary part toward the connector housing side subsequent to completion of molding; and wherein said left slide mold includes said installation through hole forming pin that is extensible into and out of said first molding space to form the installation through hole in the connector housing;

and wherein said left slide mold includes installation through hole forming pin that is extensible into and out of said first molding space to form the installation through hole in the connector housing;

and further comprising first drive mechanism operatively connected between said upper mold and said left slide mold so that movement of said upper mold toward and away from said lower mold causes said left slide mold to move transversely of said upper and lower molds which results in movement of said installation though hole forming pin into and out of said first molding space.

2. The single mold apparatus according to claim 1, wherein said second molding space is positioned in alignment with said installation forming pin and the installation through hole so that upon completion of molding and separation of mold parts, the auxiliary part is directly insertable into the installation through hole in a single linear motion while the connector housing and the auxiliary part remain within the confines of said single mold apparatus.

3. The single mold apparatus according to claim 1, wherein said single mold apparatus further comprises:

a driving part movable in a direction toward and away from said right slide mold;

said right slide mold includes a pressing part for pressing the auxiliary part transversely into the installation through hole; and a second drive mechanism operatively connected between said driving part and said right slide mold so that movement of said driving part toward and away from said right slide mold causes said right slide mold to move transversely of said upper and lower molds which results in movement of said pressing part into and out of said second mold space to thereby press the auxiliary part at least partially into the installation through hole while the connector housing and the auxiliary part remain within the confines of said single mold apparatus.

4. The single mold apparatus according to claim 1, wherein said single mold apparatus further comprises:

a driving part movable in a direction toward and away from said right slide mold;

said right slide mold includes a pressing part for pressing the auxiliary part transversely into the installation through hole; and a second drive mechanism operatively connected between said driving part and said right slide mold so that movement of said driving part toward and away from said right slide mold causes said right slide mold to move transversely of said upper and lower molds which results in movement of said pressing part into and out of said second mold space to thereby press the auxiliary part at least partially into the installation through hole while the connector housing and the auxiliary part remain within the confines of said single mold apparatus.

5. The single mold apparatus according to claim 4, wherein said first driving mechanism comprises an angular pin provided on one of said upper mold and said left slide mold and a complementary angular receiving hole provided on the other of said upper mold and said left slide mold.

6. The single mold apparatus according to claim 4, wherein said second driving mechanism comprises an angular pin provided on one of said driving part and said right slide mold and a complementary angular receiving hole provided on the other of said driving part and said right slide mold.

7. The single mold apparatus according to claim 1, further comprising an ejector provided in said lower mold adjacent said first mold space, said ejector being movable relative to said lower mold to eject the completed connector from said first mold space.

8. The single mold apparatus according to claim 1, further comprising a plurality of first and second mold spaces formed by said upper, lower, left slide and right slide molds and aligned so that a plurality of connector housings and auxiliary parts are simultaneously moldable and assembleable within said single mold apparatus.

* * * * *